United States Patent
Hope et al.

(10) Patent No.: US 11,372,557 B2
(45) Date of Patent: Jun. 28, 2022

(54) EXTRA-RESILIENT CACHE FOR RESILIENT STORAGE ARRAY

(71) Applicant: Microsoft Technology Licensing, LLC, Redmond, WA (US)

(72) Inventors: Taylor Alan Hope, Redmond, WA (US); Vinod R Shankar, Redmond, WA (US); Justin Sing Tong Cheung, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/100,557

(22) Filed: Nov. 20, 2020

(65) Prior Publication Data

US 2022/0164113 A1 May 26, 2022

(51) Int. Cl.
*G06F 3/06* (2006.01)

(52) U.S. Cl.
CPC ............ *G06F 3/0619* (2013.01); *G06F 3/065* (2013.01); *G06F 3/067* (2013.01); *G06F 3/0631* (2013.01); *G06F 3/0653* (2013.01); *G06F 3/0659* (2013.01); *G06F 3/0683* (2013.01)

(58) Field of Classification Search
CPC ...... G06F 3/0619; G06F 3/0631; G06F 3/065; G06F 3/0653; G06F 3/0659; G06F 3/067; G06F 3/0683
See application file for complete search history.

(56) References Cited

U.S. PATENT DOCUMENTS

| | | | |
|---|---|---|---|
| 9,798,631 B2 | 10/2017 | Mickens et al. | |
| 2005/0223174 A1* | 10/2005 | Mogi | G06F 16/24552 711/129 |
| 2012/0194935 A1* | 8/2012 | Edling | G11B 5/00813 360/31 |
| 2014/0379988 A1 | 12/2014 | Lyakhovitskiy et al. | |
| 2016/0357648 A1* | 12/2016 | Keremane | G06F 11/2069 |
| 2019/0227744 A1 | 7/2019 | Olarig et al. | |

OTHER PUBLICATIONS

"International Search Report and Written Opinion Issued in PCT Application No. PCT/US21/048951", dated Dec. 2, 2021, 10 Pages.

* cited by examiner

*Primary Examiner* — Hiep T Nguyen
(74) *Attorney, Agent, or Firm* — workman nydegger

(57) ABSTRACT

A data storage array is configured for m-way resiliency across a first plurality of storage nodes. The m-way resiliency causes the data storage array to direct each top-level write to at least m storage nodes within the first plurality, for committing data to a corresponding capacity region allocated on each storage node to which each write operation is directed. Based on the data storage array being configured for m-way resiliency, an extra-resilient cache is allocated across a second plurality of storage nodes comprising at least s storage nodes (where s>m), including allocating a corresponding cache region on each of the second plurality for use by the extra-resilient cache. Based on determining that a particular top-level write has not been acknowledged by at least n of the first plurality of storage nodes (where n<=m), the particular top-level write is redirected to the extra-resilient cache.

20 Claims, 6 Drawing Sheets

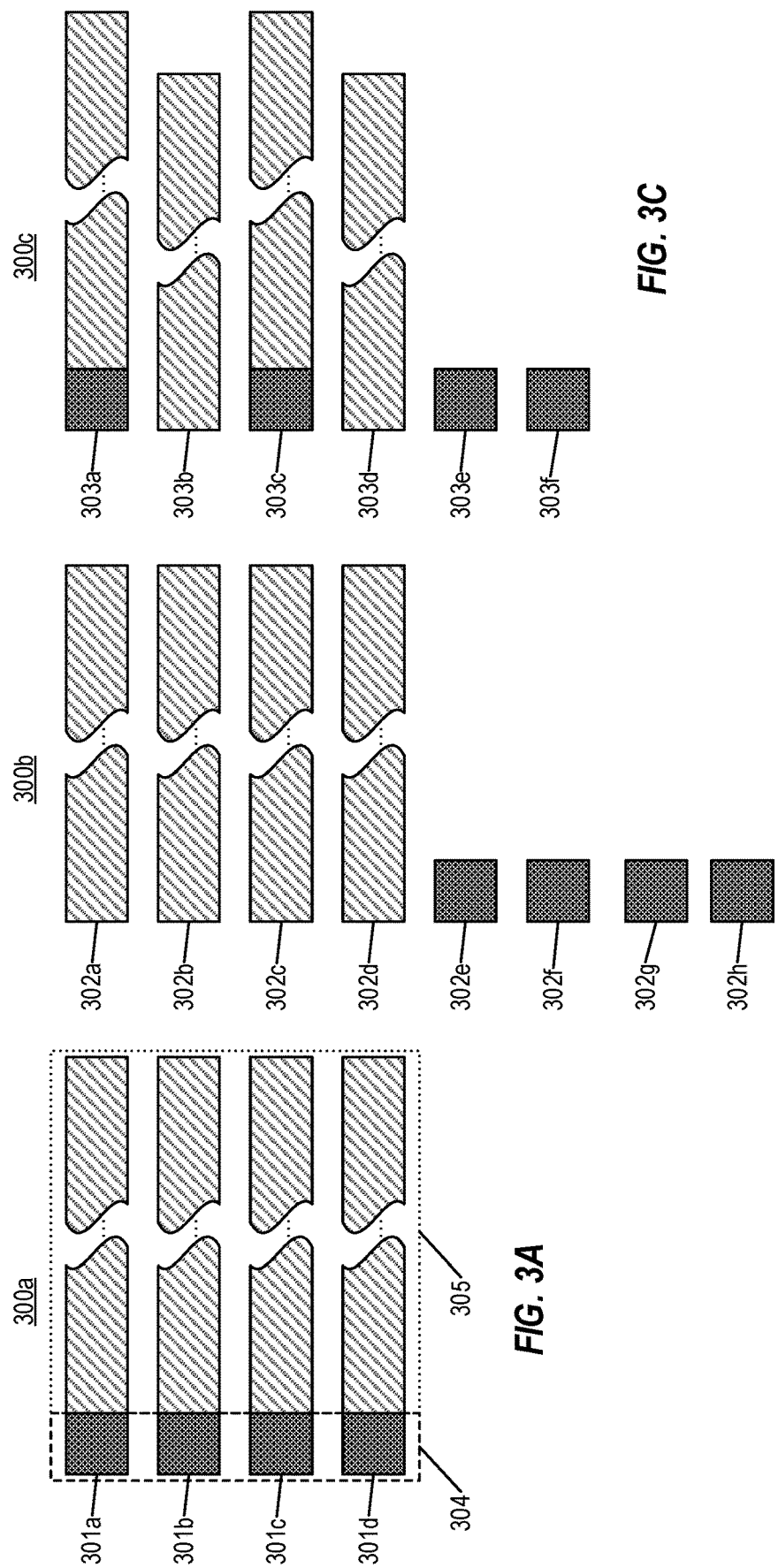

400d

| 401a | 7 |  |  |  | 1 | - | 3 | 4 | 5 | - | 7 | 8 |  |
|---|---|---|---|---|---|---|---|---|---|---|---|---|---|
| 401b | 7 |  |  |  | 1 | 2 | - | 4 | 5 | 6 | - | 8 | 9 | 10 | ... |
| 401c |  |  |  |  | 1 | 2 | 3 | - | 5 | 6 | 7 | - | 9 | 10 | ... |
| 401d | 7 |  |  |  | - | 2 | 3 | 4 | - | 6 | 7 | 8 | - | 10 | ... |

| 401a |  |  |  |  | 1 | - | 3 | 4 | 5 | - | 7 | 8 | 9 | - | ... |
|---|---|---|---|---|---|---|---|---|---|---|---|---|---|---|---|
| 401b |  |  |  |  | 1 | 2 | - | 4 | 5 | 6 | - | 8 | 9 | 10 | ... |
| 401c |  |  |  |  | 1 | 2 | 3 | - | 5 | 6 | 7 | - | 9 | 10 | ... |
| 401d |  |  |  |  | - | 2 | 3 | 4 | - | 6 | 7 | 8 | - | 10 | ... |

EXTRA-RESILIENT CACHE FOR RESILIENT STORAGE ARRAY

BACKGROUND

Many data storage solutions are structured to provide one, or both, of storage volume availability and storage volume resiliency by duplicating data across underlying physical storage. Storage volume availability refers to the ability of a storage solution to maintain a storage volume in an available state, even if one or more of the underlying physical storage devices backing that storage volume become unavailable. Storage volume resiliency refers to the ability of a storage solution to be resistant to data loss, even if one or more of the underlying physical storage devices backing that storage volume become unavailable.

To achieve one or both of storage volume availability or storage volume resiliency, many data storage solutions duplicate data across underlying physical storage using one or both of a mirror copy (or copies) of the data and/or a parity copy (or copies) of the data. As will be appreciated by ordinary skill in the art, a mirror copy of data is an exact duplicate of the data, while a parity copy of data is a mathematically derived value that can be used to reconstruct the data.

In many scenarios, this duplication happens across fault domains. For example, many storage arrays comprise a plurality of underlying physical storage devices that are distributed across a plurality of computing nodes in a cluster, with these nodes being interconnected by one or more networks. As such, the availability of copies of data can be at least temporarily interrupted due to network congestion, node restarts, etc. This means that while copies of data may be written across nodes in different fault domains, various hardware and software conditions can temporarily remove access to these nodes (and their data copies). When this happens, newly written data cannot be written to the unavailable nodes, resulting in a reduction in data resiliency, even if data availability can be maintained.

To illustrate this concept, FIG. 1A illustrates an example 100a of a four-node storage array that implements three-copy redundancy; that is, the data committed by each write operation is duplicated across three of the four nodes using mirror and/or parity copies. In example 100a, for example, there are four storage nodes 101 (i.e., storage nodes 101a-101d) that together make up the storage capacity of the array, and each discrete chunk (e.g., slab) of data is duplicated across three of the four storage nodes 101 in a round-robin manner. Notably, example 100a is structured to demonstrate this round-robin slab allocation, and not the particular layout of data on each storage node 101. For example, as shown, a write to slab 1 is duplicated across nodes 101a, 101b, and 101c; a write to slab 2 is duplicated across nodes 101b, 101c, and 101d; a write to slab 3 is duplicated across nodes 101a, 101c, and 101d; a write to slab 4 is duplicated across nodes 101b, 101b, and 101d; a write to slab 5 is duplicated across nodes 101a, 101b, and 101c; and a write to slab 6 is duplicated across nodes 101b, 101c, and 101d.

FIG. 1B illustrates an example 100b of the four-node storage array of FIG. 1A after node 101c has become at least temporarily unavailable (as indicated by broken lines). In example 101b, the round-robin allocation of slabs would normally duplicate a write to slab 7 across nodes 101a, 101c, and 101d. However, as shown, due to the unavailability of node 101c the write is only duplicated across nodes 101a and 101d. The round-robin allocation of slabs also duplicates a write to slab 8 across nodes 101a, 101b, and 101d, and as shown this duplication can succeed.

Notably, in example 100b, even though node 101c is unavailable, each slab is still available (i.e., there is at least one availably copy of the slab), and there is still data resiliency for data written both prior to, and after, the unavailability of node 101c; in particular, there are at least two copies of each slab. However, the resiliency of slab 7 has been reduced from three copies to only two copies.

Additional fault tolerance could be achieved by introducing one or more additional capacity nodes to the array (e.g., by making it a 5-node array, a 6-node array, etc.). However, adding capacity nodes leads to significant cost; for example, in most resilient data storage arrays all of the capacity nodes must be of the same data storage size, so the cost of additional capacity nodes can be significant if the data storage array has a large overall capacity. Furthermore, adding capacity nodes leads to additional complexity; for example, in terms of ongoing maintenance of those node(s) and in terms of ongoing marshalling of data to those node(s).

BRIEF SUMMARY

At least some embodiments described herein augment a resilient data storage array having an m-way resiliency. In embodiments, a resilient data storage array having a m-way resiliency transforms each "top-level" write received by the data storage array into a plurality of "bottom-level" writes that are each directed to a corresponding capacity region of at least m storage nodes, so that the data of a top-level write is redundantly directed to a plurality of storage nodes. In embodiments, the resilient data storage array only acknowledges the success of a top-level write as having been successfully committed by the data storage array if a least n storage nodes (where n m) acknowledge that corresponding bottom-level writes have been successfully committed to the capacity regions of those nodes.

In order to increase the availability and resiliency of a data storage array without incurring the significant cost and overhead of adding additional capacity nodes to the array, embodiments introduce an "extra-resilient cache" that is allocated across a plurality of storage nodes. In embodiments, the extra-resilient cache comprises a plurality of cache portions, each allocated on a different storage node, and is configured to commit each write received by the extra-resilient cache to each available cache portion (i.e., to each available storage node across which the extra-resilient cache is allocated). In embodiments, a number of storage nodes across which the extra-resilient cache is allocated exceeds a resiliency of the data storage array, itself (hence the cache being referred to as "extra" resilient). Thus, in embodiments, for a data storage array having m-way resiliency, the extra-resilient cache is allocated across at least s storage nodes, where s>m. In embodiments, the storage nodes utilized by the extra-resilient cache at least partially (and perhaps even fully) overlap with the storage nodes making up the capacity of the data storage array; in these embodiments, each overlapping storage node comprises a cache region and a capacity region.

In embodiments, a top-level write is redirected to the extra-resilient cache when corresponding bottom-level writes are not acknowledged as committed to the capacity regions of at least n storage nodes (where n m). In embodiments, when a top-level write is redirected to the extra-resilient cache, the extra-resilient cache transforms that write into a plurality of bottom-level writes that are directed to at least n storage nodes across which the extra-resilient cache is allocated, for committing to each of these node's cache portions. Since the extra-resilient cache is more resilient than the array itself (i.e., s>m), use of the extra-resilient cache enables the data storage array to tolerate a greater number of capacity node failures than would otherwise be possible, while still being able to commit writes (i.e., increased availability) and while still maintaining redundant data copies (i.e., increased resiliency).

In some embodiments, methods, systems, and computer program products are directed to using an extra-resilient cache to maintain data availability and resiliency during node degradation or node failure. These embodiments determine that a resilient data storage array is configured for m-way resiliency across a first plurality of storage nodes. The m-way resiliency causes the resilient data storage array to direct each top-level write operation received by the resilient data storage array to at least m storage nodes within the first plurality of storage nodes where m>1, for committing data to a corresponding capacity region allocated on each storage node to which each write operation is directed. Based on determining that the resilient data storage array is configured for m-way resiliency, these embodiments allocate a corresponding cache region on each of the second plurality of storage nodes for use by the extra-resilient cache. The second plurality of storage nodes at least partially overlaps with the first plurality of storage nodes and comprises s storage nodes where s>m. Based on determining that a particular top-level write operation has not been acknowledged by at least n of the first plurality of storage nodes where n m, the particular top-level write operation is redirected to the extra-resilient cache.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3A illustrates an example of allocation of an extra-resilient cache within the context of a resilient data storage array having three-way resiliency, in which there is a full overlap between capacity storage nodes and cache storage nodes;

FIG. 3B illustrates an example of allocation of an extra-resilient cache within the context of a resilient data storage array having three-way resiliency, in which there is no overlap between capacity storage nodes and cache storage nodes;

FIG. 3C illustrates an example of allocation of an extra-resilient cache within the context of a resilient data storage array having three-way resiliency, in which there is a partial overlap between capacity storage nodes and cache storage nodes;

FIG. 4D illustrates an example of the resilient data storage array FIG. 4C after one storage node has again become available;

FIG. 4E illustrates an example of the resilient data storage array FIG. 4C after two storage nodes have again become available.

DETAILED DESCRIPTION

Figure 1A:
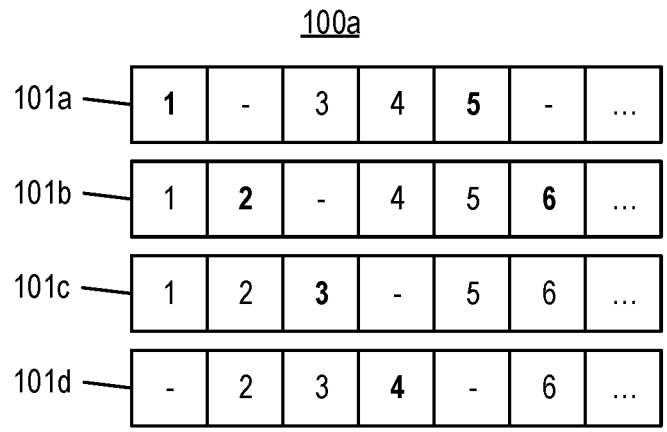
FIG. 1A illustrates an example of a four-node storage array that implements three-copy resiliency.

FIG. 1 illustrates an example computer architecture 200 that facilitates using an extra-resilient cache to maintain data availability and resiliency during node degradation or node failure. As shown, architecture 200 comprises a computer system 201 that is communicatively coupled by one or more networks 207 to a plurality of storage nodes 208 (i.e., storage node 208a to storage node 208n). Each storage node 208 comprises corresponding array storage 209 (i.e., array storage 209a for storage node 208a, array storage 209n for storage node 208n, etc.). In embodiments, for any given storage node 208, the node's array storage 209 comprises one or more physical storage devices—such as one or more hard disk drives (HDDs), one or more solid-state drives (SSDs), a mixture of HDDs and SSDs, and the like. In some embodiments, computer system 201 is, itself, one of storage nodes 208; thus, in some embodiments the computer system 201, comprises its own array storage 217 (i.e., array storage 217a to array storage 217n), which can comprise one or more HDDs, one or more SSDs, a mixture of HDDs and SSDs, and the like.

A shown, the computer system 201 comprises a processor 202 (i.e., one or more processors), memory 203 (e.g., random-access memory such as DRAM, NVRAM, etc.), communications hardware 204 (e.g., ethernet, fibre channel, etc.), and durable storage 206 (e.g., block addressable memory such as HDD, SSD, etc.), each interconnected by a bus 206 (or a plurality of busses). In embodiments in which the computer system 201 is also a storage node 208 and thus comprises its own array storage 217, the array storage 217 is also connected to the bus 206.

In general, the computer system 201 is configured to create a resilient data storage array using storage capacity (i.e., array storage 209, array storage 217, etc.) the of the storage nodes 208, including implementing an extra-resilient cache to maintain data availability and resiliency during node degradation or node failure. To accomplish this functionality, the computer system 201 comprises (within durable storage 205) computer-executable instructions and data structures corresponding to a resilient array manager 201.

As illustrated, the resilient array manager 201 comprises a variety of components (e.g., array configuration 211, write processing 212, fault handling 213, resilient cache manager 214, cache configuration 215, destaging 216, etc.) that represent functions that the resilient array manager 201 implements in accordance with various embodiments described herein. It will be appreciated that the depicted components—including their identity, sub-components, and arrangement—are presented merely as an aid in describing various embodiments of the resilient array manager 201 described herein, and that these components are non-limiting to how software and/or hardware might implement various embodiments of the resilient array manager 201 described herein, or of the particular functionality thereof.

The array configuration component 211 configures at least a first subset of the storage nodes 208 to use their array storage (i.e., array storage 209, array storage 217, etc.) to provide redundant storage capacity for a resilient data storage array. In various embodiments, the array configuration component 211 utilizes one, or both, of mirror copies and/or parity copies of data written to the resilient data storage array in order to ensure that there is a redundancy of that data across the storage nodes 208. In one example, the array configuration component 211 partitions the storage capacity of a resilient data volume managed by the resilient array manager 201 into a plurality of slabs, and ensures that each of these slabs is stored redundantly on two or more of the storage nodes 208 (using data mirroring and/or data parity schemes).

In embodiments, the array configuration component 211 configures a resilient data storage array to have an m-way resiliency. In embodiments, m-way resiliency means that a top-level write destined for a volume managed by the resilient data storage array is redundantly routed as a plurality of bottom-level writes to at least m of storage nodes 208 (where m>1), with each storage node 208 receiving a bottom-level write being instructed to commit that write to the node's array storage (i.e., array storage 209, array storage 217, etc.) as at least one of a mirror copy or a parity copy. In embodiments, each storage node 208 that receives a bottom-level write is configured to either acknowledge success of the bottom-level write once that write has been successfully committed the node's array storage, or to indicate a failure of the bottom-level write if the node cannot commit the write to its array storage.

In embodiments, a top-level write is considered to be successful only if at least n storage nodes 208 acknowledge that a corresponding bottom-level write was committed to the node's array storage. Thus, in embodiment, n defines a minimum number of redundantly committed copies. In some embodiments n equals m, such that a top-level write is considered to be successful only if each of the m storage nodes 208 to which bottom-level writes are directed acknowledge that a corresponding bottom-level write was committed. In other embodiments, n is permitted (at least temporarily) to be less than m, such that a top-level write can be considered to be successful, even if one or more of the m storage nodes 208 to which bottom-level writes are directed indicate a failure of a corresponding bottom-level write or do not respond to the corresponding bottom-level write. In some embodiments, when n is permitted to be less than m, a top-level write may be considered to be successful if it is acknowledged as committed by at least n storage nodes 208, but that top-level write is not considered to be fully resilient. Thus, in some embodiments, the resilient array manager 201 permits at least temporary drops in resiliency (i.e., a number of copies that are equal to or greater than n, but less than m) in favor of maintaining availability.

The write processing component 212 manages distribution of each top-level write received by a resilient data storage array to a plurality of storage nodes 208 as a plurality of bottom-level writes (each requesting that either a mirror or parity copy of data be committed to the storage node). Thus, the write processing component 212 generates a plurality of bottom-level writes for each top-level write, directs those bottom-level writes to at least m storage nodes 208, and waits for acknowledgement from at least n of those storage nodes 208 that corresponding bottom-level writes were committed to those node's array storage. Once the write processing component 212 receives acknowledgement that bottom-level writes have been committed to at least n storage nodes 208, the write processing component 212 provides an indication of success of the top-level write (e.g., to the component that requested the write). In embodiments, when the write processing component 212 does not receive acknowledgement that a write has been committed to at least n storage nodes 208 (e.g., within a defined time threshold), the fault handling component 213 redirects the top-level write to the resilient cache manager 214.

As shown, the resilient cache manager 214 comprises a cache configuration component 215. The cache configuration component 215 configures an extra-resilient cache across at least a second subset of the storage nodes 208. In embodiments, for a data storage array having m-way resiliency, the second subset comprises at least s storage nodes, where s>m. In embodiments, there is at least some overlap between the first subset of storage nodes 208 configured into the resilient data storage array and the second subset of storage nodes 208 utilized by the extra-resilient cache. In other embodiments, there is no overlap between the first subset of storage nodes 208 configured into the resilient data storage array and the second subset of storage nodes 208 utilized by the extra-resilient cache. In embodiments, the cache configuration component 215 configures the extra-resilient cache across the second subset of storage nodes 208 by allocating a corresponding cache portion on each of these nodes.

FIGS. 3A-3C illustrate various examples 300a-300c of allocation of an extra-resilient cache within the context of a resilient data storage array having three-way resiliency (i.e., wherein m=3). In example 300a, an extra-resilient cache 304 is allocated across each of four storage node 301a, storage node 301b, storage node 301c, and storage node 301d—such that s=4. In example 300a, each of these four storage nodes comprises a corresponding cache region (filled with cross-hatches) which, together, make up the extra-resilient cache 304. Additionally, in example 300a, each of these four storage nodes also comprises a corresponding capacity region (filled with diagonal lines) which, together, make up a resilient array capacity 305. Thus, in example 300a, there is a full overlap between storage nodes used for array capacity and storage nodes used for the extra-resilient cache.

In example 300b, an extra-resilient cache is allocated across each of storage node 302e, storage node 302f, storage node 302g, and storage node 303h (such that, again, s=4), while storage array capacity is allocated to each of storage node 302a, storage node 302b, storage node 302c, and storage node 302d. Thus, in example 300b, there is no overlap between storage nodes used for array capacity (i.e., storage nodes 302a-302d) and storage nodes used for the extra-resilient cache (i.e., storage nodes 302e-302h).

In example 300c, an extra-resilient cache is allocated across each of storage node 303a, storage node 303c, storage node 303e, and storage node 303f (such that, again, s=4), while storage array capacity is allocated to each of storage node 303a, storage node 303b, storage node 303c, and storage node 303d. Thus, in example 300c, there is a partial overlap between storage nodes used for array capacity and storage nodes used for the extra-resilient cache (i.e., storage nodes 303a and 303c).

In embodiments, when a top-level write is redirected by the fault handling component 213 to the resilient cache manager 214, the resilient cache manager 214 directs this write to each presently available cache portion of the extra-resilient as a plurality of bottom-level writes. Stated differently, when the write processing component 212 does not receive acknowledgment (e.g., within a defined time threshold) that a top-level write has been redundantly stored to at least n storage nodes 208 in the first subset of storage nodes, the fault handling component 213 redirects this top-level write to the resilient cache manager 214 to be redundantly stored on the second subset of storage nodes comprising the extra-resilient cache. The resilient cache manager 214, in turn, directs that top-level write to each node comprising the extra-resilient cache. In embodiments, the resilient cache manager 214 acknowledges to the fault handling component 213 that this top-level write has been successfully committed to the extra-resilient cache when at least n nodes within the extra-resilient cache acknowledge corresponding bottom-level writes have been successfully committed to their corresponding cache portions.

Notably, even when there is a full overlap between the first subset of storage nodes 208 utilized by the resilient data storage array and the second subset of storage nodes 208 utilized by the extra resilient cache (i.e., the first and second subsets are equal), and even when n=m, since the extra-resilient cache is "extra" resilient (i.e., s>m) the resilient cache manager 214 will be able to commit the top-level write to at least n storage nodes in situations in which a data storage array lacking an extra-resilient cache would not. To demonstrate this concept, FIGS. 4A-4E illustrate progressive examples 400a-400e of use of an extra-resilient cache with a four-node storage array configured for three-way resiliency.

Figure 4A:
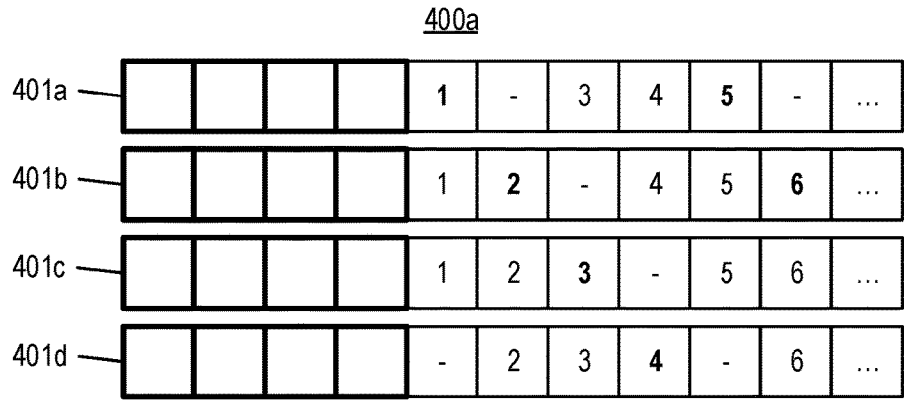
FIG. 4A illustrates an example of an extra-resilient cache configured in connection with a four-node storage array having three-way resiliency.

Initially, in FIG. 4A, example 400a shows a resilient data storage array comprising four storage nodes 401 (i.e., storage nodes 401a-401d) that together make up the storage capacity of the resilient data storage array, with m=3, n=3, and s=4. In example 400a, array storage of each storage node 401 is divided into a cache region (delineated with heavy lines) and a capacity region. Thus, in example 400a, there is a full overlap between nodes comprising the extra-resilient cache and nodes comprising the resilient data storage array. In example 400a, the capacity of the resilient data storage array is configured substantially similar to the four-node storage array of FIG. 1A. Thus, similar to example 100a, each discrete chunk (e.g., slab) of data is duplicated across three of the four storage nodes 401 in a round-robin manner. Also similar to example 100a, example 400a is structured to demonstrate this round-robin slab allocation, and not the particular layout of data on each storage node 401. In example 400a, the storage nodes 401 store the same data as storage nodes 101, while the extra-resilient cache is empty.

Figure 4B:
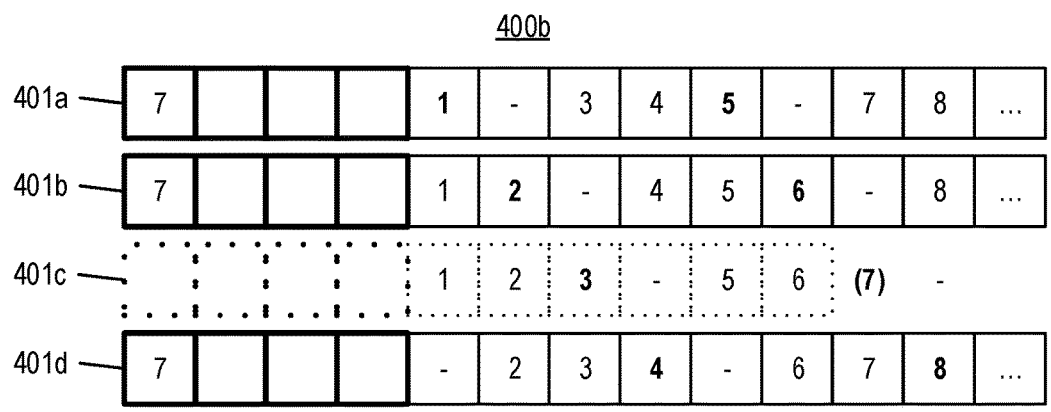
FIG. 4B illustrates an example of use of the extra-resilient cache of FIG. 4A during failure of a single node.

FIG. 4B illustrates an example 400b of the resilient data storage array of FIG. 4A after storage node 401c has become at least temporarily unavailable (as indicated by broken lines). As in example 400a, m=3, n=3, and s=4. In example 400b, due to the round-robin allocation of slabs, the write processing component 212 would normally distribute new bottom-level writes targeted to slab 7 to each of storage nodes 401a, 401c, and 401d. However, as shown, due to the unavailability of node 401c only two of these storage nodes (i.e., storage node 401a and storage node 401d) can successfully commit and acknowledge these bottom-level writes. Since the number of acknowledged commits is less than n (i.e., 2<n), the fault handling component 213 redirects the top-level write to the resilient cache manager 214, which commits the write to each available cache portion in the extra-resilient cache (i.e., storage node 401a, storage node 401b, and storage node 401d). Thus, unlike in example 100b, the write to slab 7 has a full resiliency of three nodes through use of the extra-resilient cache in the presence of a single-node failure, and has accomplished this without adding any additional nodes to the resilient data storage array. As also shown in example 400b, the write processing component 212 would normally distribute bottom-level writes to slab 8 to each of storage nodes 401a, 401b, and 401d and, in this case, these writes can successfully commit.

Figure 4C:
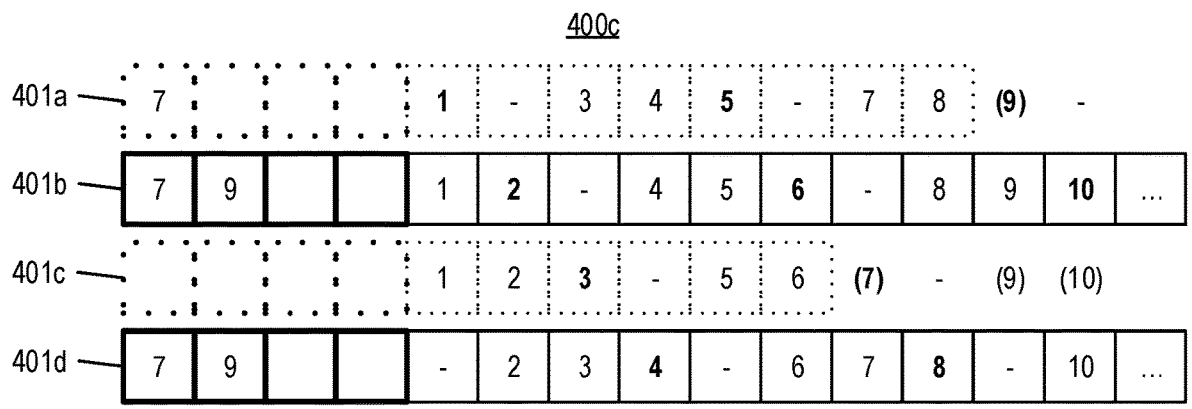
FIG. 4C illustrates an example of use of the extra-resilient cache of FIG. 4A during failure of two nodes.

As discussed, in some embodiments, n is permitted to be less than m. In these embodiments, use of the extra resilient cache can enable even additional node failures, while maintaining more redundancy than was previously possible. For example, FIG. 4C illustrates an example 400c of the resilient data storage array FIG. 4B after storage node 401a has become at least temporarily unavailable (as indicated by broken lines), and in which the number of required redundant copies has been reduced (e.g., based on an administrator intervention) from three to two (i.e., such that, now, m=3, n=2, and s=4). In example 401c, due to the round-robin allocation of slabs, the write processing component 212 would normally distribute bottom-level writes targeted to slab 9 to each of storage nodes 401a, 401b, and 401c. However, as shown, due to the unavailability of nodes 401a and 401c only one of these storage nodes (i.e., storage node 401b) can successfully commit and acknowledge these bottom-level writes. Since the number of acknowledged commits is less than n (i.e., 1<2), the fault handling component 213 redirects the top-level write to the resilient cache manager 214, which commits the write to each available cache portion in the extra-resilient cache (i.e., storage node 401b and storage node 401d). As also shown in example 400c, the write processing component 212 would normally distribute bottom-level writes to slab 10 to each of storage nodes 401b, 401c, and 401d. As also shown in example 400c, the write processing component 212 would normally distribute bottom-level writes targeted to slab 10 to each of storage nodes 401b, 401c, and 401d. As shown, due to the unavailability of nodes 401a and 401c only two of these storage nodes (i.e., storage node 401b and storage node 401d) can successfully commit and acknowledge these bottom-level writes. However, since n is now two, the number of acknowledged commits at least equals n (i.e., storage node 401b and storage node 402d), so the write processing component 212 can acknowledge success of the write.

Figure 1B:
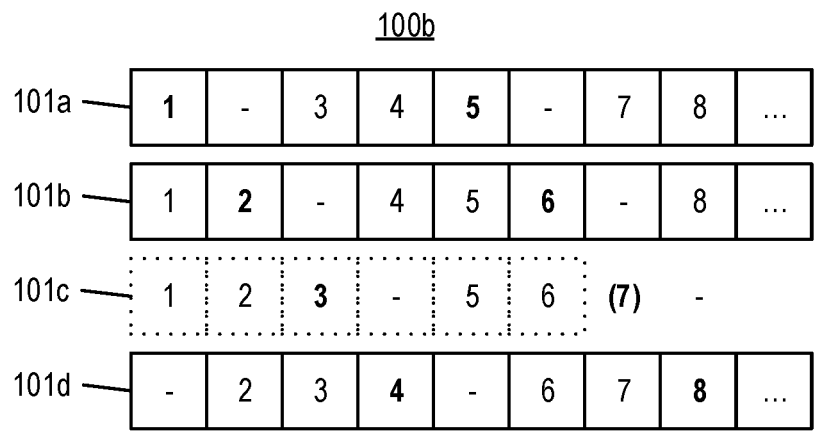
FIG. 1B illustrates the four-node storage array of FIG. 1A after a node has become at least temporarily unavailable.
Figure 1C:
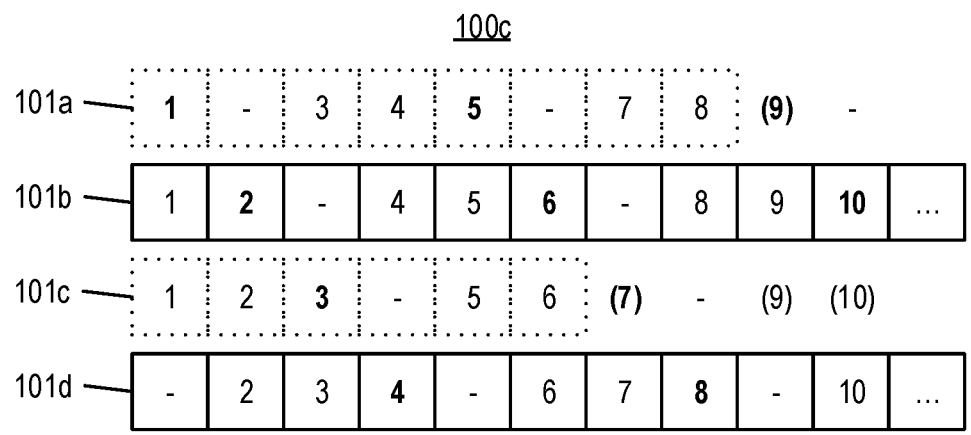
FIG. 1C illustrates the four-node storage array of FIG. 1B after an additional node has become at least temporarily unavailable.

Turning briefly to FIG. 1C, assuming that the storage array in FIG. 1B would have been permitted to continue operating committing writes in its degraded state, example 100c shows the four-node storage array of FIG. 1B after node 101a has also become at least temporarily unavailable (as indicated by broken lines). In the example 101c, the round-robin allocation of slabs would normally duplicate a write to slab 9 across nodes 101a, 101b, and 101c. However, but as shown, due to the unavailability of nodes 101a and 101*c* the write is only committed to node 101*b*. Thus, there is a lack of any resiliency of this write to slab 9. The round-robin allocation of slabs would also normally duplicate a write to slab 10 across nodes 101*b*, 101*c*, and 101*d*, but as shown, due to the unavailability of 101*c* it is only written to nodes 101*b* and 101*d*. Returning to FIG. 4C, unlike in example 100*c* in which there was no resiliency for the write to slab 9, there is resiliency in example 400*c* through storage node 401*d* and the extra-resilient cache. Additionally, in example 100*c*, there was a loss of resiliency of the prior write to slab 7, while example 400*c* preserves resiliency of slab 7 through storage node 401*b* and the extra-resilient cache. Notably, this resiliency of slabs 7 and 9 in the presence of a two-node failure, has been accomplished in example 400*c* without adding any additional nodes to the resilient data storage array.

As shown, the resilient cache manager component 201 also comprises a destaging component 216. In embodiments, the destaging component 216 operates to destage data from the extra-resilient cache to redundant storage array capacity when additional storage nodes become available. For example, FIG. 4D illustrates an example 400*d* of the resilient data storage array FIG. 4C after storage node 401*c* has become available again. Here, the write to slab 9 is destaged by the destaging component 216 from the extra-resilient cache to node 401*c*, meeting the (now current) n=2 redundancy requirement for slab 9. FIG. 4E illustrates an example 400*e* of the resilient data storage array FIG. 4D after storage node 401*a* has also become available. Here, the write to slab 7 is destaged by destaging component 216 from the extra-resilient cache to node 401*a*. Additionally, slab 9 has been copied by the resilient array manager 210 from one of nodes 401*b* or 401*c* to node 401*a*. Notably, if n had instead equaled 3, in embodiments the destaging component 216 would have destaged slabs 7 or 9 only when both of nodes 401*a* and 401*c* became available.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Figure 5:
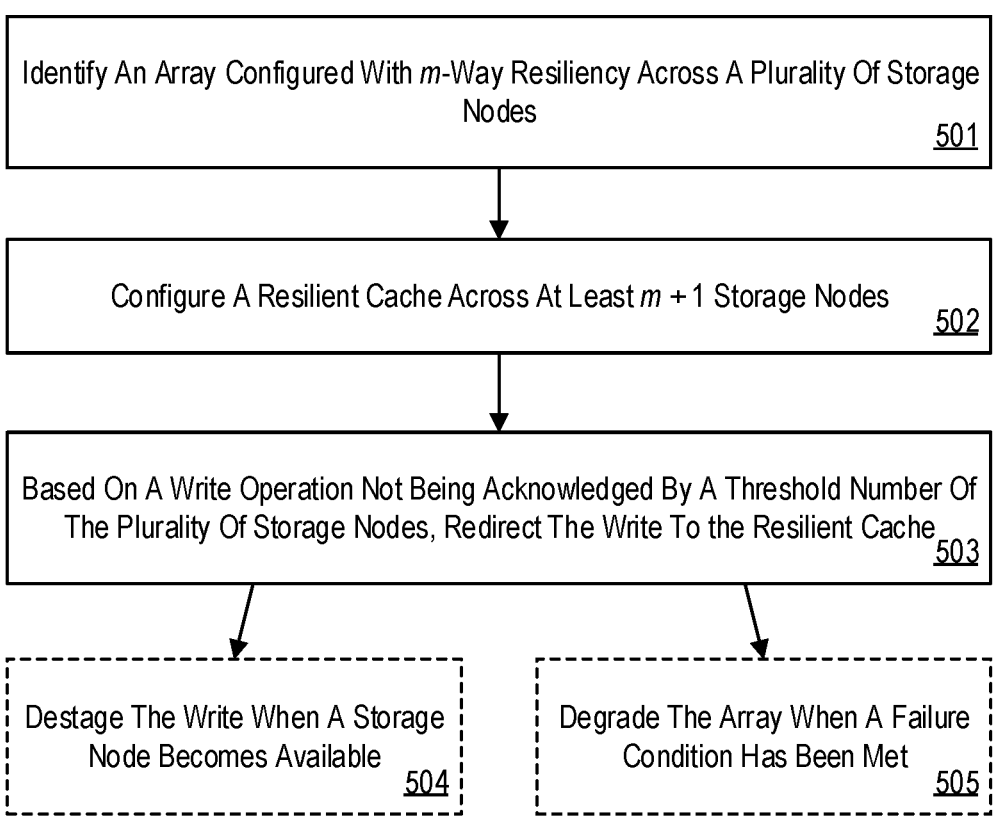
FIG. 5 illustrates a flow chart of an example method for using an extra-resilient cache to maintain data availability and resiliency during node degradation or node failure.

FIG. 5 illustrates a flow chart of an example method 500 for using an extra-resilient cache to maintain data availability and resiliency during node degradation or node failure. Method 500 will be described with respect to the components and data of computer architecture 200 and the examples of FIGS. 4A-4E. In embodiments, method 500 is implemented at a computer system (e.g., computer system 201) that includes a processor (e.g., processor 202), based on computer-executable instructions (e.g., resilient array manager 210) stored at a hardware storage device (e.g., durable storage 205).

Method 500 comprises an act 501 of identifying an array configured with m-way resiliency across a plurality of storage nodes. In some embodiments, act 501 comprises determining that a resilient data storage array is configured for m-way resiliency across a first plurality of storage nodes, the m-way resiliency causing the resilient data storage array to direct each top-level write operation received by the resilient data storage array to at least m storage nodes within the first plurality of storage nodes where m>1, for committing data to a corresponding capacity region allocated on each storage node to which each write operation is directed. In an example, the resilient array manager 210 includes the array configuration component 211, which configures storage nodes 208 into a resilient data storage array having m-way resiliency. When the resilient array manager 210 receives a top-level write, the write processing component 212 identifies this m-way configuration and distributes that top-level write to m bottom-level writes targeted to m of the storage nodes 208. In a particular example, FIGS. 4A and 4B show examples 400*a* and 400*b* of a resilient data storage array having four storage nodes 401*a*-401*d* configured with three-way resiliency.

Method 500 also comprises an act 502 of configuring a resilient cache across at least m+1 storage nodes. In some embodiments, act 502 comprises, based on determining that the resilient data storage array is configured for m-way resiliency, allocating an extra-resilient cache across a second plurality of storage nodes, including allocating a corresponding cache region on each of the second plurality of storage nodes for use by the extra-resilient cache, the second plurality of storage nodes at least partially overlapping with the first plurality of storage nodes and comprising s storage nodes where s>m. In examples 400*a* and 400*b*, for instance, the cache configuration component 215 has allocated an extra-resilient cache across storage nodes 401*a*-401*d*, by allocating a corresponding cache portion (delineated by heavy lines) on each of storage nodes 401*a*-401*d*.

Figure 2:
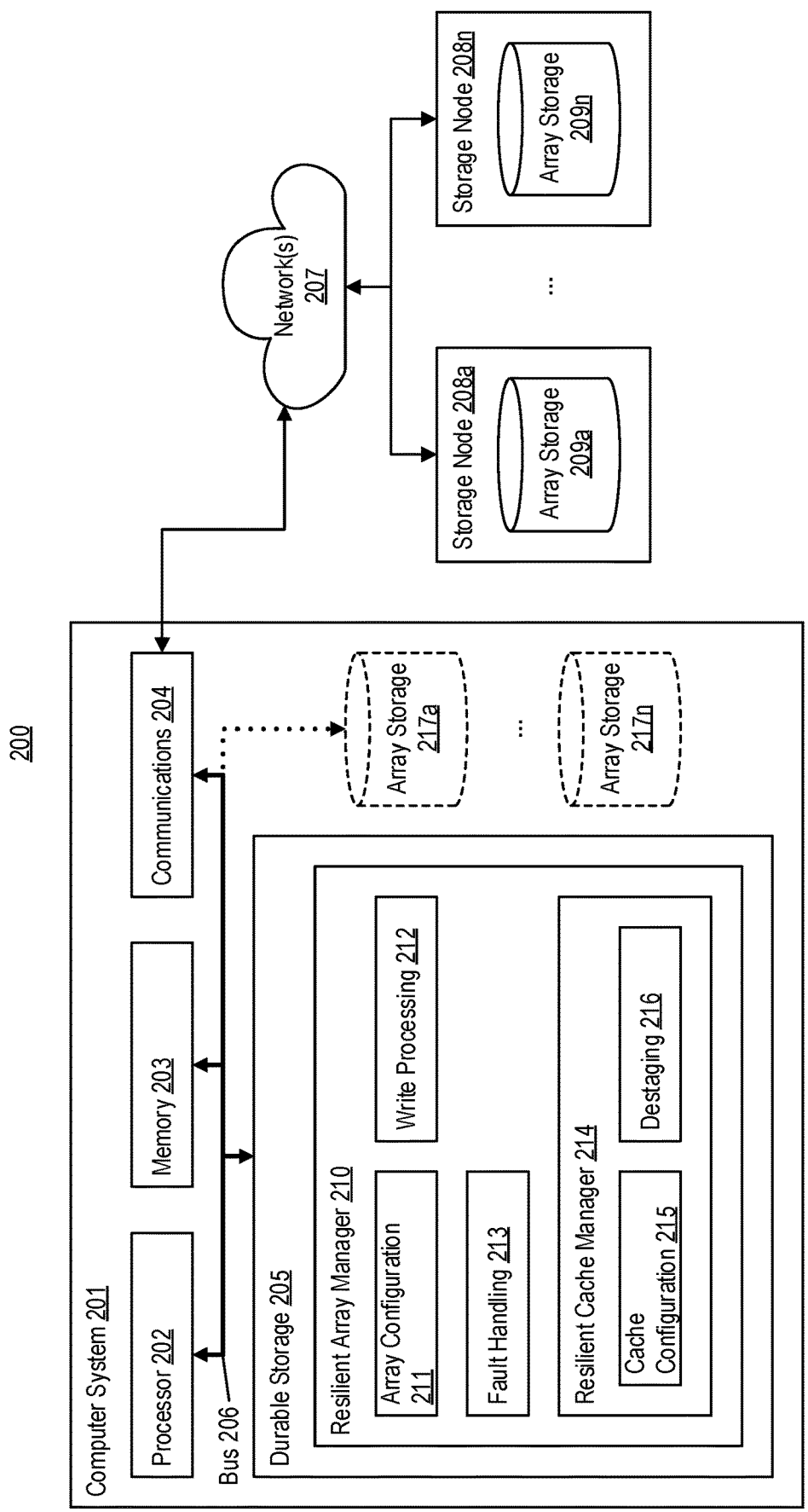
FIG. 2 illustrates an example computer architecture that facilitates using an extra-resilient cache to maintain data availability and resiliency during node degradation or node failure.

As shown in FIG. 2, storage nodes 208 are connected to computer system 201 via one or more networks 207. Thus, in embodiments, at least one of the first plurality of storage nodes or at least one of the second plurality of storage nodes is connected to the computer system via a network. As was also discussed, in embodiments the computer system 201 may include array storage 217 and, itself, be one of storage nodes 208. Thus, in embodiments, the computer system comprises at least one of the first plurality of storage nodes or at least one of the second plurality of storage nodes.

Method 500 also comprises an act 503 of, based on a write operation not being acknowledged by a threshold number of the plurality of storage nodes, redirecting the write to the resilient cache. In some embodiments, act 503 comprises, based on determining that a particular top-level write operation has not been acknowledged by at least n of the first plurality of storage nodes where n m, redirecting the particular top-level write operation to the extra-resilient cache. In an example, based on the write processing component 212 determining that at least n bottom level writes corresponding to a top-level write have not been acknowledged, the fault handling component 213 redirects the top-level write to the resilient cache manager 214. The resilient cache manager 214, in turn, directs this top-level write to each available node comprising the extra-resilient cache (e.g., as a plurality of bottom-level writes directed to those nodes). In example 400*b*, for instance, due to the failure of storage node 401*c*, the write to slab 7 is acknowledged only by storage node 401*a* and storage node 401*d*. Since the number of acknowledged writes (i.e., two) is less than n (i.e., three), the write processing component 212 triggers the fault handling component 213, which redirects the top-level write to the resilient cache manager 214.

In embodiments, use of the extra-resilient cache act 503 provides a technical effect of enabling the resilient data storage array to preserve both availability and resiliency in the presence of a node failure that—using prior techniques—would have resulted in a loss of at least one of availability or resiliency. Thus, for example, in one embodiment, the particular top-level write operation is directed to the extra-resilient cache in act 503 rather than indicating a success of the particular top-level write operation and degrading the resilient data storage array as might have been the case absent the extra-resilient cache. In another embodiment, the particular top-level write operation is directed to the extra-resilient cache in act 503 rather than indicating a failure of the particular top-level write operation as might have been the case absent the extra-resilient cache.

Act 503 may be triggered based on one or more storage node fails to acknowledge a bottom-level write for a variety of reasons—which may be temporary or permanent. In one example, a storage node fails to acknowledge a bottom-level write due to a failure of the network(s) 207 to transmit a bottom-level write from the computer system 207 to the storage node, or due to a failure of the network(s) 207 to transmit an acknowledgment of success of the bottom-level write back to the computer system 201. In another example, a storage node fails to acknowledge a bottom-level write due to the storage node being otherwise occupied, such as due to a software upgrade, due to a node restart, or due to a maintenance task. In another example, a storage node fails to acknowledge a bottom-level write due to the storage node having a software or a hardware fault. Thus, in various embodiments, the particular top-level write operation is not acknowledged by at least n of the first plurality of storage nodes due to at least one of a storage node degradation or a storage node failure within the first plurality of storage nodes.

In embodiments, in act 503 the resilient cache manager 214 redirects the top-level write to at least n storage nodes within the extra-resilient cache. Thus, in embodiments, redirecting the particular top-level write operation to the extra-resilient cache causes the particular top-level write operation to be directed to at least n storage nodes within the second plurality of storage nodes, for committing particular data to the corresponding cache region allocated on each of the n storage nodes within the second plurality of storage nodes.

In embodiments, in connection with act 503, the resilient cache manager 214 acknowledges success of the write if at least n storage nodes acknowledge a successful write to the extra-resilient cache. Thus, in embodiments when at least n storage nodes acknowledge a successful write to the extra-resilient cache, method 500 also comprises determining that particular data for the particular top-level write operation has been committed to at least n storage nodes within the second plurality of storage nodes and indicating a success of the particular top-level write operation. Conversely, in embodiments when at least n storage nodes cannot acknowledge a successful write to the extra-resilient cache, method 500 also comprises determining that particular data for the particular top-level write operation cannot be committed to at least n storage nodes within the second plurality of storage nodes and indicating a failure of the particular top-level write operation.

As shown in FIG. 5, after a write is redirected to the extra-resilient cache in act 503, method 500 can later proceed to either destage the write (act 504) or degrade the array (act 505). In embodiments, method 500 destages the write in act 504 when a storage node becomes available. In embodiments, method 500 degrades the array in act 505 when a failure condition has been met.

In some embodiments, act 504 comprises, subsequent to directing the particular top-level write operation to the extra-resilient cache, determining that at least one of the first plurality of storage nodes has become available, and destaging particular data for the particular top-level write operation from the extra-resilient cache to the corresponding capacity region allocated on one or more of the first plurality of storage nodes. In an example, when additional storage node(s) becomes available, the destaging component 216 destages data from the extra-resilient cache to this node (or nodes). Examples 400d and 400e, for example, illustrate destaging of writes to slabs 7 and 10 from the extra-resilient cache as storage nodes become available.

In alternative embodiments, act 505 comprises, subsequent to directing the particular top-level write operation to the extra-resilient cache, determining a threshold for use of the extra-resilient cache has been met and degrading the resilient data storage array. In an example, if the write processing component 212 continues to be unable to receive acknowledgements from at least n nodes for at least a threshold, the fault handling component 213 degrades the array. In embodiments, this degradation is based on a determination that a situation causing the lack of requisite acknowledgments has become a non-temporary condition. In some embodiments, the threshold for use of the extra-resilient cache comprises at least one of a duration during which writes have been directed to the extra-resilient cache, a number of writes that have been directed to the extra-resilient cache, an available capacity of the extra-resilient cache, or an amount of the extra-resilient cache that has been consumed.

Accordingly, the embodiments herein augment a resilient data storage array having an m-way resiliency in order to increase the availability and resiliency of the data storage array—without incurring the significant cost and overhead of adding additional capacity nodes to the array—by introducing an "extra-resilient cache" that is allocated across a plurality of storage nodes. This extra-resilient cache comprises a plurality of cache portions, each allocated on a different storage node, and is configured to commit each write received by the extra-resilient cache to each available cache portion (i.e., to each available storage node across which the extra-resilient cache is allocated). A top-level write is redirected to the extra-resilient cache when corresponding bottom-level writes are not acknowledged as committed to the capacity regions of at least n storage nodes (where n m). When a top-level write is redirected to the extra-resilient cache, the extra-resilient cache transforms that write into a plurality of bottom-level writes that are directed to at least n storage nodes across which the extra-resilient cache is allocated, for committing to each of these node's cache portions. Since the extra-resilient cache is more resilient than the array itself (i.e., s>m), use of the extra-resilient cache enables the data storage array to tolerate a greater number of capacity node failures than would otherwise be possible, while still being able to commit writes (i.e., increased availability) and while still maintaining redundant data copies (i.e., increased resiliency).

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set" and "subset" are intended to exclude an empty set, and thus "set" is defined as a non-empty set, and "subset" is defined as a non-empty subset.

What is claimed:

1. A method, implemented at a computer system that includes a processor, for using an extra-resilient cache to maintain data availability and resiliency during node degradation or node failure, the method comprising:
   determining that a resilient data storage array is configured for m-way resiliency across a first plurality of storage nodes, the m-way resiliency causing the resilient data storage array to direct each write top-level operation received by the resilient data storage array to at least m storage nodes within the first plurality of storage nodes where m>1, for committing data to a corresponding capacity region allocated on each storage node to which each write operation is directed;
   based on determining that the resilient data storage array is configured for m-way resiliency, allocating an extra-resilient cache across a second plurality of storage nodes, including allocating a corresponding cache region on each of the second plurality of storage nodes for use by the extra-resilient cache, the second plurality of storage nodes at least partially overlapping with the first plurality of storage nodes and comprising s storage nodes where s>m; and
   based on determining that a particular top-level write operation has not been acknowledged by at least n of the first plurality of storage nodes where n m, redirecting the particular top-level write operation to the extra-resilient cache.

2. The method of claim 1, wherein the particular top-level write operation is redirected to the extra-resilient cache rather than,
   indicating a success of the particular top-level write operation and degrading the resilient data storage array; or
   indicating a failure of the particular top-level write operation.

3. The method of claim 1, wherein redirecting the particular top-level write operation to the extra-resilient cache causes the particular top-level write operation to be directed to at least n storage nodes within the second plurality of storage nodes, for committing particular data to the corresponding cache region allocated on each of the n storage nodes within the second plurality of storage nodes.

4. The method of claim 1, further comprising:
   determining that particular data for the particular top-level write operation has been committed to at least n storage nodes within the second plurality of storage nodes; and
   indicating a success of the particular top-level write operation.

5. The method of claim 1, further comprising:
   determining that particular data for the particular top-level write operation cannot be committed to at least n storage nodes within the second plurality of storage nodes; and
   indicating a failure of the particular top-level write operation.

6. The method of claim 1, wherein the particular top-level write operation is not acknowledged by at least n of the first plurality of storage nodes due to at least one of a storage node degradation or a storage node failure within the first plurality of storage nodes.

7. The method of claim 1, further comprising:
   subsequent to redirecting the particular top-level write operation to the extra-resilient cache, determining that at least one of the first plurality of storage nodes has become available; and
   destaging particular data for the particular top-level write operation from the extra-resilient cache to the corresponding capacity region allocated on one or more of the first plurality of storage nodes.

8. The method of claim 1, further comprising:
   subsequent to redirecting the particular top-level write operation to the extra-resilient cache, determining a threshold for use of the extra-resilient cache has been met; and
   degrading the resilient data storage array.

9. The method of claim 8, wherein the threshold for use of the extra-resilient cache comprises at least one of:
   a duration during which writes have been redirected to the extra-resilient cache;
   a number of writes that have been redirected to the extra-resilient cache;
   an available capacity of the extra-resilient cache; or
   an amount of the extra-resilient cache that has been consumed.

10. The method of claim 1, wherein at least one of the first plurality of storage nodes or at least one of the first plurality of storage nodes is connected to the computer system via a network.

11. A computer system for using an extra-resilient cache to maintain data availability and resiliency during node degradation or node failure, comprising:
   a processor; and
   a hardware storage device that stores computer-executable instructions that are executable by the processor to cause the computer system to perform at least the following:
      determine that a resilient data storage array is configured for m-way resiliency across a first plurality of storage nodes, the m-way resiliency causing the resilient data storage array to direct each top-level write operation received by the resilient data storage array to at least m storage nodes within the first plurality of storage nodes where m>1, for committing data to a corresponding capacity region allocated on each storage node to which each write operation is directed;
      based on determining that the resilient data storage array is configured for m-way resiliency, allocate an extra-resilient cache across a second plurality of storage nodes, including allocating a corresponding cache region on each of the second plurality of storage nodes for use by the extra-resilient cache, the second plurality of storage nodes at least partially overlapping with the first plurality of storage nodes and comprising s storage nodes where s>m; and
      based on determining that a particular top-level write operation has not been acknowledged by at least n of the first plurality of storage nodes where n m, redirect the particular top-level write operation to the extra-resilient cache.

12. The computer system of claim 11, wherein redirecting the particular top-level write operation to the extra-resilient cache causes the particular top-level write operation to be directed to at least n storage nodes within the second plurality of storage nodes, for committing particular data to the corresponding cache region allocated on each of the n storage nodes within the second plurality of storage nodes.

13. The computer system of claim 11, the hardware storage device also storing instructions that are executable by the processor to cause the computer system to:

determine that particular data for the particular top-level write operation has been committed to at least n storage nodes within the second plurality of storage nodes; and indicate a success of the particular top-level write operation.

14. The computer system of claim 11, the hardware storage device also storing instructions that are executable by the processor to cause the computer system to:

determine that particular data for the particular top-level write operation cannot be committed to at least n storage nodes within the second plurality of storage nodes; and indicate a failure of the particular top-level write operation.

15. The computer system of claim 11, wherein the particular top-level write operation is not acknowledged by at least n of the first plurality of storage nodes due to at least one of a storage node degradation or a storage node failure within the first plurality of storage nodes.

16. The computer system of claim 11, the hardware storage device also storing instructions that are executable by the processor to cause the computer system to:

subsequent to redirecting the particular top-level write operation to the extra-resilient cache, determine that at least one of the first plurality of storage nodes has become available; and destage particular data for the particular top-level write operation from the extra-resilient cache to the corresponding capacity region allocated on one or more of the first plurality of storage nodes.

17. The computer system of claim 11, the hardware storage device also storing instructions that are executable by the processor to cause the computer system to:

subsequent to redirecting the particular top-level write operation to the extra-resilient cache, determine a threshold for use of the extra-resilient cache has been met; and degrade the resilient data storage array.

18. The computer system of claim 17, wherein the threshold for use of the extra-resilient cache comprises at least one of:

a duration during which writes have been redirected to the extra-resilient cache;

a number of writes that have been redirected to the extra-resilient cache;

an available capacity of the extra-resilient cache; or an amount of the extra-resilient cache that has been consumed.

19. The computer system of claim 11, wherein at least one of the first plurality of storage nodes or at least one of the first plurality of storage nodes is connected to the computer system via a network.

20. A computer program product comprising a hardware storage device that stores computer-executable instructions that are executable by a processor to cause a computer system to use an extra-resilient cache to maintain data availability and resiliency during node degradation or node failure, the computer-executable instructions including instructions that are executable by the processor to cause the computer system to perform at least the following:

determine that a resilient data storage array is configured for m-way resiliency across a first plurality of storage nodes, the m-way resiliency causing the resilient data storage array to direct each write top-level operation received by the resilient data storage array to at least m storage nodes within the first plurality of storage nodes where m>1, for committing data to a corresponding capacity region allocated on each storage node to which each write operation is directed;

based on determining that the resilient data storage array is configured for m-way resiliency, allocate an extra-resilient cache across a second plurality of storage nodes, including allocating a corresponding cache region on each of the second plurality of storage nodes for use by the extra-resilient cache, the second plurality of storage nodes at least partially overlapping with the first plurality of storage nodes and comprising s storage nodes where s>m; and based on determining that a particular top-level write operation has not been acknowledged by at least n of the first plurality of storage nodes where n m, redirect the particular top-level write operation to the extra-resilient cache.

* * * * *